United States Patent [19]

Koyama et al.

[11] 4,264,677
[45] Apr. 28, 1981

[54] RED COLORED PHOSPHOR AND PROCESS FOR PREPARING THE SAME

[75] Inventors: Kazuo Koyama, Hatano; Takashi Miyagawa, Hiratsuka; Michio Mathuyuki, Aichi, all of Japan

[73] Assignee: Kasei Optonix, Ltd., Tokyo, Japan

[21] Appl. No.: 8,966

[22] Filed: Feb. 2, 1979

[30] Foreign Application Priority Data

Feb. 3, 1978 [JP] Japan .................................. 53-11313

[51] Int. Cl.$^3$ ............................................. C09K 11/46
[52] U.S. Cl. ............................. 428/403; 252/301.4 S; 313/468; 427/68; 427/218; 428/913; 428/690
[58] Field of Search ................... 252/301.4 S, 301.6 S; 428/403, 539, 913; 427/215, 218, 68; 313/468

[56] References Cited

U.S. PATENT DOCUMENTS

| | | | |
|---|---|---|---|
| 3,875,449 | 4/1975 | Byler et al. | 252/301.6 S X |
| 4,021,588 | 5/1977 | Royce et al. | 252/301.4 S X |
| 4,057,507 | 11/1977 | Yamamoto et al. | 252/301.4 S |

Primary Examiner—Jack Cooper

[57] ABSTRACT

An europium activated oxysulfide phosphor represented by the formula $$Ln_2O_2S:Eu,(Sm)$$

wherein Ln is at least one element selected from the group consisting of yttrium, gadolinium, lanthanum, lutetium and scandium is colored into red by mixing therewith a proper amount of calcium salt solely or together with strontium salt, and firing the resulting mixture at a temperature within the range of 1000° to 1500° C. By the firing, a CaS:Eu,(Sm) phosphor or a (Ca,Sr)S:Eu,(Sm) phosphor having a red body color is produced in an external portion of the $Ln_2O_2S:Eu,(Sm)$ phosphor particle. The red colored phosphor thus obtained is used as a red emitting phosphor of a high contrast cathode ray tube for color television.

11 Claims, 2 Drawing Figures

RED COLORED PHOSPHOR AND PROCESS FOR PREPARING THE SAME

BACKGROUND OF THE INVENTION

1. Field of the Invention

This invention relates to a colored phosphor, and more particularly to a red colored phosphor employed in a cathode ray tube for color television and to the process for preparing the same.

2. Description of the Prior Art

As is well known in the art, adhesion of blue pigment particles, green pigment particles and red pigment particles to the surfaces of blue emitting phosphor particles, green emitting phosphor particles and red emitting phosphor particles respectively constituting a fluorescent screen of a cathode ray tube for color television markedly enhances the contrast of an image formed on the fluorescent screen. This is because a part of the visible region of the emission spectra inherent to the phosphor is cut out due to the filter effect of pigment particles adhering thereto resulting in a clearer color of emitted light and further because a part of the incident light is absorbed by the pigment particles resulting in reduction of the amount of the light reflected from the fluorescent screen (see Japanese Patent Laid Open No. 56,146/1975). The phosphor with pigment particles adhering to the surface thereof (hereinafter referred to as "pigment coated phosphor") is prepared by mixing a dispersion wherein pigment particles are dispersed in a solution of water soluble resin such as polyvinyl pyrrolidone (PVP) and a dispersion wherein phosphor particles are dispersed in a gelatin solution, stirring the mixed dispersions throughly, and drying the resulting precipitate, as disclosed in, for example, U.S. Pat. No. 3,275,466.

In the pigment coated phosphor, it is important that pigment particles adhere uniformly and firmly to the surface of a phosphor. The pigment coated phosphor prepared by the above-mentioned process is not sufficient in both uniformity in distribution of the pigment particles over the surface of the phosphor and firmness of adhesion of the pigment particles to the surface of the phosphor. When the pigment particles do not adhere uniformly to the surface of the phosphor, but adhere thereto in a state in which they flocculate each other, it is necessary to use a larger amount of pigment particles to obtain a certain relative reflectance (reflectance for the light containing light components of the wavelength ranging from 400 nm to 700 nm in relative to that of MgO plate defined to be 100%) and, as the result, the luminance of the pigment coated phosphor markedly lowers. Further, when the firmness of adhesion of the pigment particles to the surface of the phosphor is not sufficiently high, the pigment particles adhering to the surface of the phosphor are easily separated therefrom even by a small physical friction as in the ball mill treatment. Generally, in the pigment coated phosphor in which the pigment particles do not adhere uniformly to the surface of the phosphor, many of the pigment particles adhere thereto in a state in which they flocculate each other and also, the firmness of adhesion of the pigment particles to the surface of the phosphor is not sufficiently high. Although the uniformity in distribution of the pigment particles over the surface of the phosphor and the firmness of adhesion of the pigment particles to the surface of the phosphor can considerably be enhanced by improving the process for preparing the pigment coated phosphor as disclosed in, for example, Japanese Patent Laid Open No. 5088/1978, the uniformity in distribution of the pigment particles over the surface of the phosphor and the firmness of adhesion of the pigment particles to the surface of the phosphor are always serious problems so far as the pigment coated phosphor is employed. Further, the pigment coated phosphor involves other problems in the production thereof such as requirement for highly sophisticated treatment and long period of operation.

As mentioned above, a pigment coated phosphor in which a phosphor is colored by the pigment particles adhering to the surface thereof has been employed heretofore as a phosphor of a cathode ray tube for color television. Instead of the pigment coated phosphor, a colored phosphor, that is, a phosphor having a body color of its own, can possibly be employed as a phosphor of the cathode ray tube for color television. When employing the colored phosphor, there is no problem of both the uniformity in distribution and the firmness of adhesion of the pigment particles as in the pigment coated phosphor. However, a colored phosphor suitable for a cathode ray tube for color television has not been known heretofore.

SUMMARY OF THE INVENTION

Therefore, an object of the present invention is to provide a red colored phosphor suitable as a red emitting phosphor of a cathode ray tube resulting high contrast for color television.

Another object of the present invention is to provide a process for preparing a red colored phosphor suitable for a cathode ray tube for color television.

In order to accomplish the aforementioned objects, the inventors investigated to redden the white body color of an europium activated oxysulfide phosphor which is useful as a red emitting phosphor of a cathode ray tube for color television, and which is represented by the formula $$Ln_2O_2S:Eu, (Sm)$$

wherein Ln is at least one element selected from the group consisting of yttrium, gadolinium, lanthanum, lutetium and scandium. As the result of the investigation, it was discovered that when the $Ln_2O_2S:Eu$, (Sm) phosphor was mixed with a proper amount of calcium salt solely or together with strontium salt and the resulting mixture was fired, a reaction between the $Ln_2O_2S:Eu$, (Sm) phosphor and the salt or salts advanced from the surface of the $Ln_2O_2S:Eu$, (Sm) phosphor particle to the interior portion thereof and, as the result of the reaction, a red colored phosphor suitable as a red emitting phosphor of a cathode ray tube resulting high contrast for color television could be obtained.

The red colored phosphor of the present invention thus obtained comprises an internal portion consisting of a $Ln_2O_2S:Eu$ phosphor and an external portion consisting essentially of an europium activated sulfide phosphor represented by the formula $$(Ca_{1-x}, Sr_x) S:Eu, (Sm)$$

wherein x is a number within the range of $0 \leq x \leq 0.75$.

The process for preparing the red colored phosphor of the present invention comprises steps of mixing a $Ln_2O_2S:Eu$, (Sm) phosphor, a calcium salt and a strontium salt in stoichiometric ratios wherein (1) the amount of calcium is $(1-x)$ mols in respect of x mols of strontium, x being a number within the range of $0 \leq x \leq 0.75$, and (2) the total amount of calcium and strontium is within the range of 1 to 50 weight% of a $Ln_2O_2S$:Eu, (Sm) phosphor, and firing the resulting mixture at a temperature, within the range of 1000° to 1500° C.

In this specification, the representation "(Sm)" in the general formulae of the phosphors, for example, $Ln_2O_2S$:Eu, (Sm) and $(Ca_{1-x}, Sr_x)S$:Eu, (Sm), means that the phosphor may contain Sm as a coactivator of Eu. Further, in connection with this representation, the expression "europium activated" means both "europium activated" and "europium and samarium activated".

DETAILED DESCRIPTION OF THE INVENTION

Figure 1:
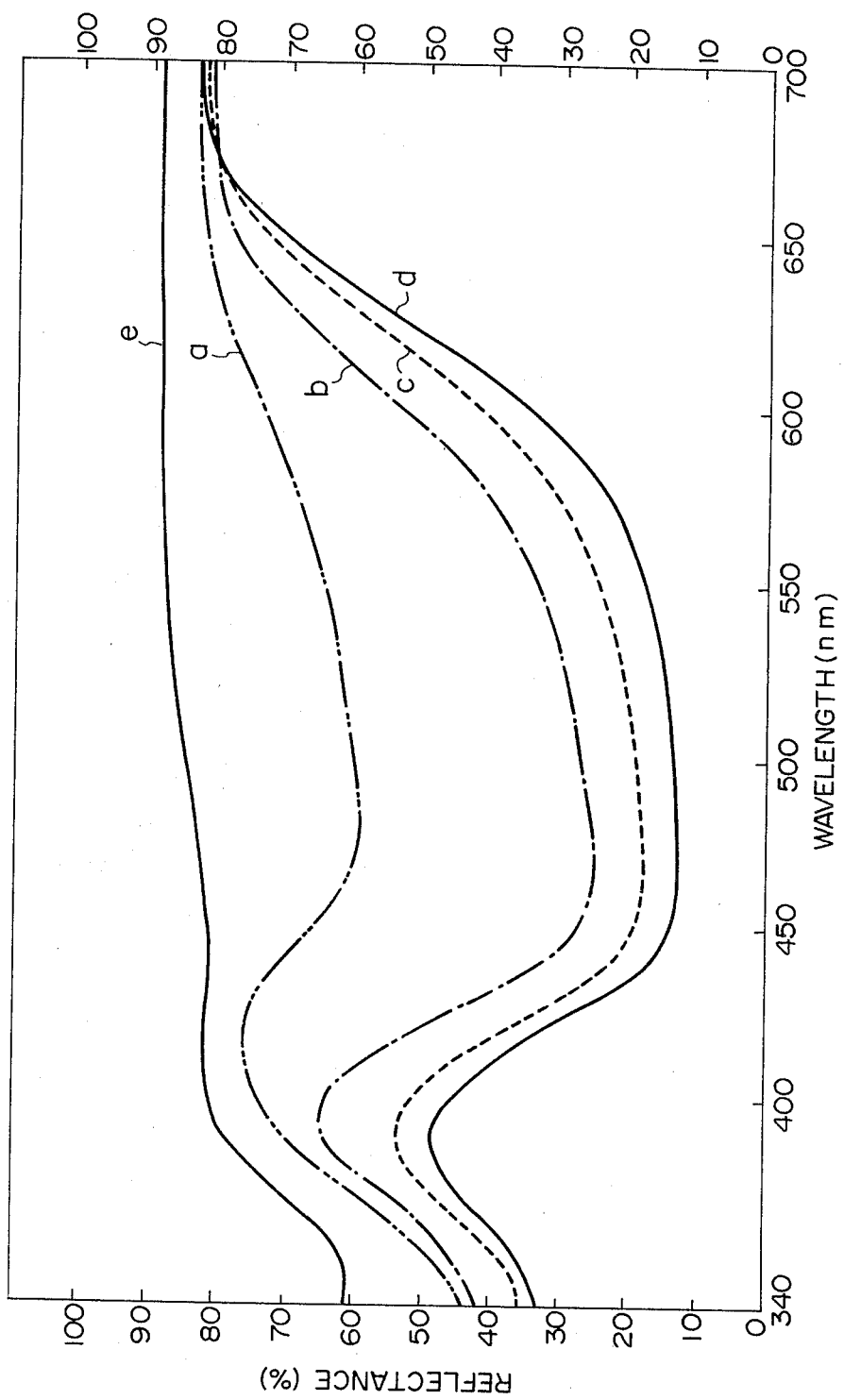
FIG. 1 is a graph showing the reflection spectra of both the colored phosphors of the present invention (curves a, b, c and d) and the conventional $Y_2O_2S$:Eu phosphor (curve e)

The present invention will be described in detail hereinafter.

The red colored phosphor of the present invention is prepared by the following process.

The following raw materials are used:

(1) a $Ln_2O_2S$:Eu, (Sm) phosphor, (2) a calcium salt such as CaO, CaS, $CaCO_3$, $CaSO_4$, $Ca(NO_3)_2$, $Ca(OH)_2$, $CaCl_2$, etc., and (3) a strontium salt such as SrO, SrS, $SrCO_3$, $SrSO_4$, $Sr(NO_3)_2$, $SrCl_2$, etc.

The aforesaid three raw materials are weighed out and mixed well by means of a ball mill, a mortar, or the like to obtain a raw material mixture. The calcium salt and the strontium salt are weighed out in such a stoichiometric ratio that the amount of Ca is $(1-x)$ mols in respect of x mols of strontium, wherein x is a number within the range of $0 \leq x \leq 0.75$. It is needless to say that when $x=0$, the strontium salt is not used. When x is more than 0.75, the reflectance of the colored phosphor obtained is raised in the region of wavelength shorter than that of the red region. Accordingly, the degree of red coloration of the colored phosphor obtained is lowered and the relative reflectance thereof is not lowered sufficiently. The preferable range of x is $0 \leq x \leq 0.5$. Further, the Ca salt and the Sr salt are mixed with the $Ln_2O_2S$:Eu, (Sm) phosphor in such a stoichiometric ratio that the total amount of Ca and Sr is within the range of 1 to 50 weight% of the $Ln_2O_2S$:Eu, (Sm) phosphor. When the total amount of Ca and Sr is less than 1 weight% of the $Ln_2O_2S$:Eu, (Sm) phosphor, the degree of red coloration of the colored phosphor obtained is lowered. On the other hand, when the total amount of Ca and Sr is more than 50 weight% of $Ln_2O_2S$:Eu, (Sm) phosphor, the amount of Ca and Sr which do not react with $Ln_2O_2S$:Eu, (Sm) phosphor increases. Therefore, the degree of red coloration of the colored phosphor obtained is lowered and further, the luminance thereof is lowered. The preferable total amount of Ca and Sr is within the range of 2 to 20 weight% of the $Ln_2O_2S$:Eu, (Sm) phosphor. The amount of Eu activator of the $Ln_2O_2S$:Eu, (Sm) phosphor which is one of the raw materials is preferably within the range of $10^{-2}$ to $1.5 \times 10^{-1}$ grams, more preferably $2 \times 10^{-2}$ to $7 \times 10^{-2}$ grams per 1 gram of $Ln_2O_2S$ host material in view of luminance. When Sm is used as a coactivator of Eu, the amount of Sm activator is preferably less than $2 \times 10^{-3}$ grams, more preferably within the range of $5 \times 10^{-4}$ to $1.5 \times 10^{-3}$ grams per 1 gram of $Ln_2O_2S$ host material.

Then, the aforesaid raw material mixture is placed in a heat resistant container such as a quartz crucible, an alumina crucible, or the like, and fired. The firing is performed at a temperature within the range of 1000° to 1500° C. When the firing is performed at a temperature lower than 1000° C., a reaction does not take place and therefore, a colored phosphor is not obtained. On the other hand, when the firing is performed at a temperature higher than 1500° C., the reaction occurs even deep in the $Ln_2O_2S$:Eu, (Sm) phosphor particle and the properties of the colored phosphor obtained such as granularity of the phosphor powder and luminance thereof are deteriorated. The firing temperature is preferably within the range of 1150° to 1400° C. The firing period is determined depending on the amount of the raw material mixture, the firing temperature and so forth. In general, the firing period is from 10 minutes to 5 hours. When the firing period is shorter than 10 minutes, the reaction hardly takes place. On the other hand, when the firing period is longer than 5 hours, the reaction occurs even deep in the $Ln_2O_2S$:Eu, (Sm) phosphor particle and the properties of the colored phosphor obtained such as granularity of the phosphor powder and luminance are deteriorated. Although the firing can be performed in an air, the firing is preferably performed in a reducing atmosphere such as a nitrogen atmosphere containing less than 5% of hydrogen and a carbon vapor atmosphere, an inert atmosphere such as a nitrogen atmosphere and an argon atmosphere, or a sulfuric atmosphere such as a sulfur vapor atmosphere to prevent the $(Ca_{1-x}, Sr_x)$ S:Eu, (Sm) phosphor produced from being oxidized.

During the firing, the $Ln_2O_2S$:Eu, (Sm) phosphor particle reacts with the Ca salt and the Sr salt, and the reaction advances from the surface of the $Ln_2O_2S$:Eu, (Sm) phosphor particle to the interior portion thereof. As the result of the reaction, the $Ln_2O_2S$:Eu, (Sm) phosphor particle having an external portion which contains the $(Ca_{1-x}, Sr_x)S$:Eu, (Sm) phosphor having a red body color is produced. When both the Ca salt and the Sr salt are oxides or salts which can be easily converted to oxides at the aforesaid firing temperature or at a temperature below the firing temperature, the reaction is represented by the reaction formula

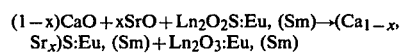

wherein the amount of Eu or Eu and Sm of the left side is equivalent to that of the right side.

As shown in the above reaction formula, CaO and SrO are sulfurated by the $Ln_2O_2S$:Eu, (Sm) phosphor to produce $(Ca_{1-x}, Sr_x)S$. Simultaneously with the sulfuration, a part of Eu or Eu and Sm contained in the $Ln_2O_2S$:Eu, (Sm) phosphor is diffused into the $(Ca_{1-x},$ $Sr_x)S$ and thus, the $(Ca_{1-x}, Sr_x)S:Eu, (Sm)$ phosphor having a red body color is produced. On the other hand, the $Ln_2O_2S:Eu, (Sm)$ phosphor is oxidized into $Ln_2O_3:Eu, (Sm)$ phosphor. Thus, the red colored external portion containing the $(Ca_{1-x}, Sr_x) S:Eu, (Sm)$ phosphor and the $Ln_2O_3:Eu, (Sm)$ phosphor is formed.

When both the Ca salt and the Sr salt are sulfides, the reaction is represented by the reaction formula

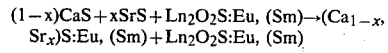

$(1-x)CaS + xSrS + Ln_2O_2S:Eu, (Sm) \rightarrow (Ca_{1-x}, Sr_x)S:Eu, (Sm) + Ln_2O_2S:Eu, (Sm)$ wherein the amount of Eu or Eu and Sm of the left side is equivalent to that of the right side.

As shown in the above reaction formula, a part of Eu or Eu and Sm contained in the $Ln_2O_2S:Eu, (Sm)$ phosphor is diffused into the sulfide $(Ca_{1-x}, Sr_x)S$ and thus, the $(Ca_{1-x}, Sr_x) S:Eu, (Sm)$ phosphor having a red body color is produced. On the other hand, $Ln_2O_2S:Eu, (Sm)$ phosphor itself becomes a $Ln_2O_2S:Eu, (Sm)$ phosphor in which the amount of Eu or Eu and Sm is reduced. Thus, the red colored external portion containing the $(Ca_{1-x}, Sr_x) S:Eu, (Sm)$ phosphor and the $Ln_2O_2S:Eu, (Sm)$ phosphor in which the amount of Eu or Eu and Sm is reduced is formed.

As described above, in both the cases in which sulfide is used as the Ca salt and the Sr salt and in which salt other than sulfide is used as the Ca salt and Sr salt, the external portion which contains the $(Ca_{1-x}, Sr_x)S:Eu,$ (Sm) phosphor having a red body color is formed, whereby the $Ln_2O_2S:Eu, (Sm)$ phosphor is colored into red. The occurrence of the aforesaid reactions was confirmed by analyzing the colored phosphor obtained by means of X-ray diffraction, and the like. It is needless to say that when both sulfide and salt other than sulfide are used as the Ca salt and the Sr salt, the aforesaid two reactions take place simultaneously.

After the firing, the fired product is subjected to the processes generally employed in the production of phosphor, such as washing, drying and so forth to obtain the colored phosphor of the present invention.

The colored phosphor of the present invention prepared by the above-mentioned process has a red body color, as described above. The degree of red coloration and the luminance of the colored phosphor generally depend on the thickness of the external portion. That is, the thicker the external portion becomes, the higher the degree of red coloration becomes and accordingly, the lower the relative reflectance becomes. On the other hand, the thicker the external portion becomes, the lower the luminance becomes. The thickness of the external portion mainly depends on the firing temperature and the firing period. That is, the higher the firing temperature becomes, the deeper the reaction advances to the inner portion of the $Ln_2O_2S:Eu, (Sm)$ phosphor particle and the thicker the external portion becomes. Accordingly, the higher the firing temperature becomes, the higher the degree pf red coloration becomes and the lower the relative reflectance becomes, but the lower the luminance becomes. Further, in a given firing temperature, the longer the firing period becomes, the deeper the reaction advances to the inner portion of the $Ln_2O_2S:Eu, (Sm)$ phosphor particle and the thicker the external portion becomes. Accordingly, in a given firing temperature, the longer the firing period becomes, the higher the degree of red coloration becomes and the lower the relative reflectance becomes, but the lower the luminance becomes.

FIG. 1 is a graph showing the reflection spectra of the colored phosphors of the present invention and the $Ln_2O_2S:Eu, (Sm)$ phosphor. In the graph, curves a, b, c and d are the reflection spectra of the colored phosphors of the present invention all of which are composed of an internal portion consisting of a $Y_2O_2S:Eu$ phosphor and an external portion consisting essentially of a CaS:Eu phosphor, and curve e is the reflection spectrum of the $Y_2O_2S:Eu$ phosphor which is a raw material of the colored phosphors of curves a, b, c and d. All of the colored phosphors of curves a, b, c and d were prepared by adding CaO to the $Y_2O_2S:Eu$ phosphor in an amount of 10 weight% of the $Y_2O_2S:Eu$ phosphor, but the firing conditions of these colored phosphors differed from each other. That is, the colored phosphors of curves a, b, c and d were obtained by firing the same raw material mixtures at 1150° C. for 1 hour, at 1150° C. for 2 hours, at 1300° C. for 30 minutes and at 1300° C. for 1 hour, respectively.

As is clear from the comparison of curve e with curves a, b, c and d, the colored phosphors of the present invention have a red body color, whereas the body color of the $Y_2O_2S:Eu$ phosphor is almost white. Further, as is clear from the comparison of curves a and b with curves c and d, in the colored phosphor of the present invention, the higher the firing temperature becomes, the lower the reflectance of the colored phosphor obtained becomes in the region of the wavelength shorter than that of the red region and accordingly, the higher the degree of red coloration thereof becomes. Moreover, as is clear from the comparison of curve a with curve b or curve c with curve d, in a given firing temperature, the longer the firing period becomes, the higher the degree of red coloration of the colored phosphor obtained becomes.

The degree of red coloration of the colored phosphor of the present invention also depends on the molar ratio of Ca and Sr which constitute the $(Ca_{1-x}, Sr_x)S:Eu,$ (Sm) phosphor contained in the external portion. That is, in accordance with the increase of the amount of Sr (in accordance with the increase of x value), the reflectance of the colored phosphor is raised in the region of the wavelength shorter than that of the red region, whereby the degree of red coloration thereof is lowered and the relative reflectance thereof is raised. For this reason, in the present invention, x value is limited to within the range of $0 \leq x \leq 0.75$.

Figure 2:
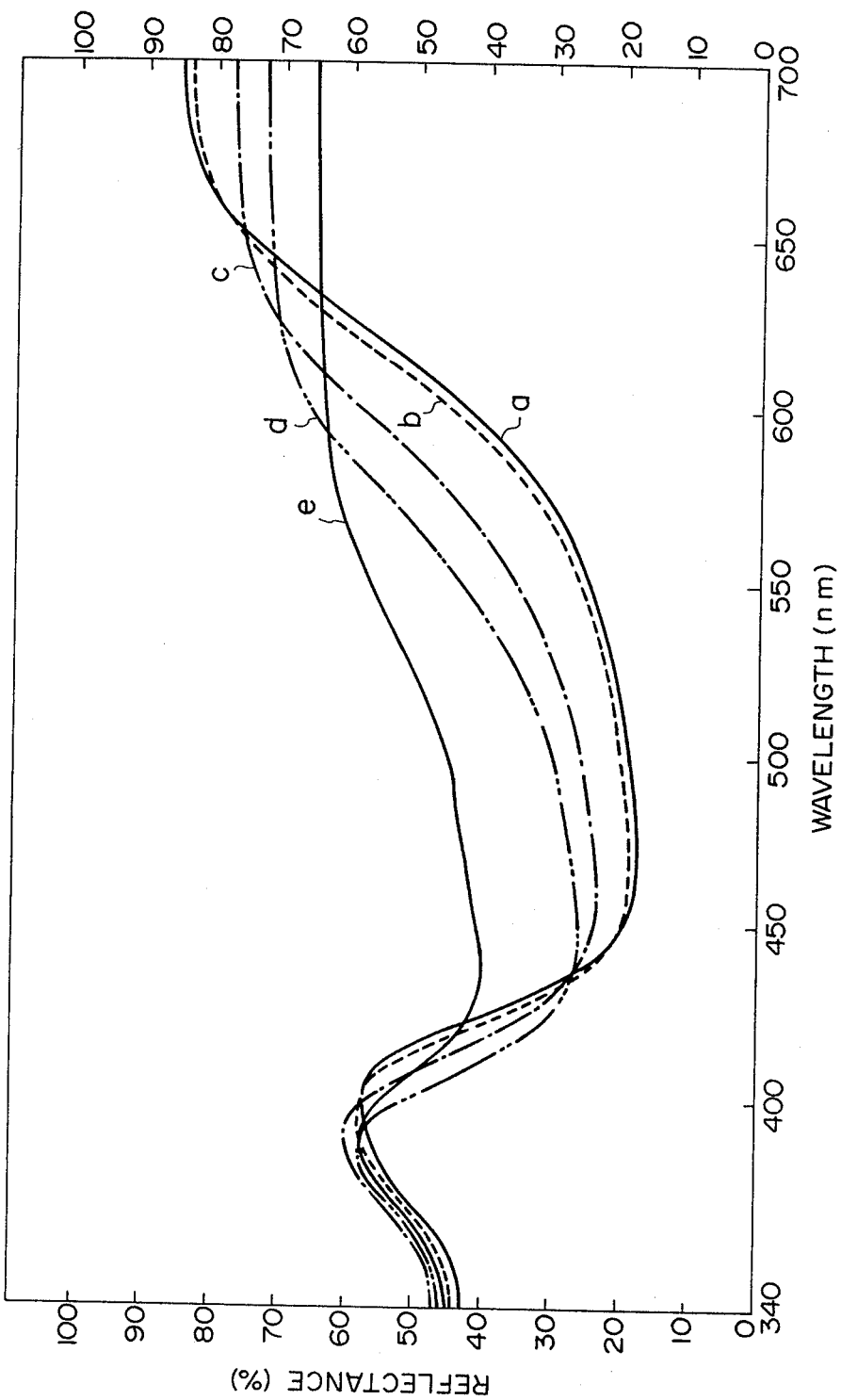
FIG. 2 is a graph showing the reflection spectra of the colored phosphors of the present invention which were prepared under the same conditions and which comprise an internal portion consisting of a $Y_2O_2S$:Eu phosphor and an external portion consisting essentially of a $(Ca_{1-x}, Sr_x)S$:Eu phosphor, wherein curves a, b, c, d and e are reflection spectra of the colored phosphors in which x values are 0 0.125, 0.5, 0.75 and 1, respectively.

FIG. 2 is a graph showing the reflection spectra of the colored phosphors of the present invention which were prepared under the same firing conditions and which comprise an internal portion consisting of a $Y_2O_2S:Eu$ phosphor and an external portion consisting essentially of a $(Ca_{1-x}, Sr_x)S:Eu$ phosphor. In the graph, curves a, b, c, d and e are the reflection spectra of the colored phosphors in which x values are 0, 0.125, 0.5, 0.75 and 1, respectively.

As is clear from FIG. 2, the reflectance of the colored phosphor of the present invention is raised in the region of the wavelength shorter than that of the red region with the increase of x value, whereby the degree of red coloration thereof is lowered and the relative reflectance thereof is raised. In particular, the reflectance of the colored phosphor of curve e (x=1, not included in the present invention) is markedly raised in the region of the wavelength shorter than that of the red region. X value of the $(Ca_{1-x}, Sr_x)S:Eu, (Sm)$ phosphor contained in the external portion is preferably within the range of $0 \leq x \leq 0.5$.

As described above, the luminance of the colored phosphor of the present invention is lower than that of the conventional $Ln_2O_2S$:Eu, (Sm) phosphor which is not colored. However, the decrease of the luminance in the colored phosphor of the present invention is small. When the colored phosphor of the present invention is compared with the conventional pigment coated phosphor both of which have the same relative reflectance, the colored phosphor of the present invention exhibits almost the same luminance as that of the pigment coated phosphor. As the reason for the small decrease of the luminance, it is presumed that the phosphors contained in the external portion, that is, the $(Ca_{1-x}, Sr_x)S$:Eu, (Sm) phosphor, the $Ln_2O_3$:Eu, (Sm) phosphor, the $Ln_2O_2S$:Eu, (Sm) phosphor in which the amount of Eu or Eu and Sm is reduced and the remaining $Ln_2O_2S$:Eu, (Sm) phosphor, also emit light and these emissions are added to the emission of the internal portion consisting of the $Ln_2O_2S$:Eu, (Sm) phosphor. The emissions of the $(Ca_{1-x}, Sr_x)S$:Eu, (Sm) phosphor and the $Ln_2O_3$:Eu, (Sm) phosphor contained in the external portion do not affect the emission of the internal portion consisting of the $Ln_2O_2S$:Eu, (Sm) phosphor, because the color of the emitted light of the $(Ca_{1-x}, Sr_x)S$:Eu, (Sm) phosphor and the $Ln_2O_3$:Eu, (Sm) phosphor is also red based on the Eu activator contained therein. Accordingly, the color of the emitted light of the colored phosphor of the present invention is essentially the same as that of the conventional $Ln_2O_2S$:Eu, (Sm) phosphor which is not colored.

In accordance with the present invention, a phosphor suitable as a red emitting phosphor of a cathode ray tube resulting high contrast for color television can be obtained without any problem regarding uniformity in distribution and firmness of adhesion of the pigment particles in the conventional pigment coated phosphor. Further, in the present invention, the highly sophisticated treatment and the long period of operation in the production of the pigment coated phosphor are not required and a phosphor suitable as a red emitting phosphor of a cathode ray tube resulting high contrast for color television can easily be prepared by a process similar to the process employed in the conventional production of phosphors. In particular, in accordance with the present invention, a phosphor having a desirable relative reflectance can easily be obtained only by varying the manufacturing conditions, especially, the firing conditions. The colored phosphor of the present invention is mainly used as a red emitting phosphor of a cathode ray tube for color television. However, the use thereof is not limited thereto.

The present invention will hereinafter be described referring to several examples.

EXAMPLE 1

20 grams of $Y_2O_2S$:Eu phosphor in which the amount of Eu is $3.6 \times 10^{-2}$ grams per 1 gram of $Y_2O_2S$ host material and 1 gram of $Ca(OH)_2$ were mixed well in a mortar. The resultant mixture was placed in an alumina crucible and then fired for 2 hours at 1150° C. in a carbon vapor atmosphere. After the firing, the fired product was washed with water and dried to obtain a red colored phosphor.

The red colored phosphor thus prepared had a relative reflectance of 41.0% and a luminance of 81%, and was suitable as a red emitting phosphor of a cathode ray tube for color television. The aforesaid relative reflectance is shown by a relative value with that of MgO plate defined to be 100%. Also, the aforesaid luminance is shown by a relative value with that of the $Y_2O_2S$:Eu phosphor before coloration defined to be 100%. In the following examples, the relative reflectance and the luminance are shown in this manner.

EXAMPLE 2

20 grams of $Y_2O_2S$:Eu, Sm phosphor in which the amount of Eu and the amount of Sm are $1.5 \times 10^{-3}$ grams and $10^{-2}$ grams per 1 gram of $Y_2O_2S$ host material, respectively, and 2 grams of $CaCO_3$ were mixed well in a mortar. The resultant mixture was place in an alumina crucible and then fired for 2 hours at 1150° C. in a carbon vapor atmosphere. After the firing, the fired product was washed with water and dried to obtain a red colored phosphor.

The red colored phosphor thus prepared had a relative reflectance of 51.5% and a luminance of 85%, and was suitable as a red emitting phosphor of a cathode ray tube for color television.

EXAMPLE 3

500 grams of $Y_2O_2S$:Eu phosphor in which the amount of Eu is $3.6 \times 10^{-2}$ grams per 1 gram of $Y_2O_2S$ host material and 25 grams of $Ca(OH)_2$ were mixed well in a mortar. The resultant mixture was placed in an alumina crucible and then fired for 30 minutes at 1300° C. in a carbon vapor atmosphere. After the firing, the fired product was washed with water and dried to obtain a red colored phosphor.

The red colored phosphor thus prepared had a relative reflectance of 55% and a luminance of 85%, and was suitable as a red emitting phosphor of a cathode ray tube for color television.

EXAMPLE 4

20 grams of $Gd_2O_2S$:Eu phosphor in which the amount of Eu is $2.35 \times 10^{-2}$ grams per 1 gram of $Gd_2O_2S$ host material and 1 gram of $Ca(OH)_2$ were mixed well in a mortar. The resultant mixture was placed in an alumina crucible and fired for 30 minutes at 1300° C. in a carbon vapor atmosphere. After the firing, the fired product was washed with water and dried to obtain a red colored phosphor.

The red colored phosphor thus prepared had a relative reflectance of 55% and a luminance of 85%, and was suitable as a red emitting phosphor of a cathode ray tube for color television.

EXAMPLE 5

20 grams of $Y_2O_2S$:Eu phosphor in which the amount of Eu is $3.6 \times 10^{-2}$ grams per 1 gram of $Y_2O_2S$ host material, 1.11 grams of $Ca(OH)_2$ and 0.735 grams of $SrCO_3$ were mixed well in a mortar. The resultant mixture was placed in an alumina crucible and then fired for 30 minutes at 1300° C. in a carbon vapor atmosphere. After the firing, the fired product was washed with water and dried to obtain a red colored phosphor.

The red colored phosphor thus prepared had a relative reflectance of 41.5% and a luminance of 82%, and was suitable as a red emitting phosphor of a cathode ray tube for color television.

EXAMPLE 6

20 grams of $Y_2O_2S$:Eu phosphor in which the amount of Eu is $3.6 \times 10^{-2}$ grams per 1 gram of $Y_2O_2S$ host material, 1.08 grams of CaS and 0.60 grams of SrS were mixed well in a mortar. The resultant mixture was placed in an alumina crucible and then fired for 30 minutes at 1300° C. in a carbon vapor atmosphere. After the firing, the fired product was washed with water and dried to obtain a red colored phosphor.

The red colored phosphor thus prepared had a relative reflectance of 42.0% and a luminance of 83%, and was suitable as a red emitting phosphor of a cathode ray tube for color television.

We claim:

1. A particulate red colored phosphor that is red emitting under cathode ray excitation comprising an internal portion consisting of an europium and optionally, samarium activated oxysulfide phosphor represented by the formula $Ln_2O_2S:Eu, (Sm)$ wherein Ln is at least at one element selected from the group consisting of yttrium, gadolinium, lanthanum, lutetium and scandium, and an external portion consisting essentially of an europium and optionally, samarium activated sulfide red colored phosphor represented by the formula $(Ca_{1-x}, Sr_x)S:Eu, (Sm)$ wherein x is a number within the range of $0 \leq x \leq 0.75$.

2. A red colored phosphor as defined in claim 1 wherein said x is a number within the range of $0 \leq x \leq 0.5$.

3. A process for preparing a red colored phosphor comprising steps of mixing europium and optionally, samarium activated oxysulfide red emitting under cathode ray excitation phosphor particles represented by the formula $Ln_2O_2S:Eu, (Sm)$ wherein Ln is at least one element selected from the group consisting of yttrium, gadolinium, lanthanum, lutetium and scandium, a calcium salt and a strontium salt in stoichiometric ratios wherein (1) the amount of calcium is $(1-x)$ mols in respect of x mols of strontium, x being a number within the range of $0 \leq x \leq 0.75$, and (2) the total amount of calcium and strontium is within the range of 1 to 50 weight % of said oxysulfide phosphor, and firing the resulting mixture at a temperature within the range of 1000° to 1500° C.

4. A process as defined in claim 3 wherein said x is a number within the range of $0 \leq x \leq 0.5$.

5. A process as defined in claim 3 wherein said total amount of calcium and strontium is within the range of 2 to 20 weight%.

6. A process as defined in claim 3 wherein said firing temperature is within the range of 1150° to 1400° C.

7. A process as defined in claim 3 wherein a firing period is within the range of 10 minutes to 5 hours.

8. A process as defined in claim 3 wherein the amount of europium of said oxysulfide phosphor is within the range of $10^{-2}$ to $1.5 \times 10^{-1}$ grams per 1 gram of an oxysulfide hose material.

9. A process as defined in claim 8 wherein said amount of europium is within the range of $2 \times 10^{-2}$ to $7 \times 10^{-2}$ grams.

10. A process as defined in claim 8 wherein said oxysulfide phosphor is activated with both europium and samarium and the amount of said samarium is less than $2 \times 10^{-3}$ grams per 1 gram of said oxysulfide host material.

11. A process as defined in claim 10 wherein said amount of samarium is within the range of $5 \times 10^{-4}$ to $1.5 \times 10^{-3}$ grams.

* * * * *